Nov. 3, 1959 B. OSTENDORF, JR 2,911,544

SHIFT REGISTER CIRCUIT CONTROLLED BY A PULSE GENERATING CIRCUIT

Filed Oct. 6, 1955

INVENTOR
B. OSTENDORF, JR.
BY John E Cassidy
ATTORNEY

United States Patent Office 2,911,544
Patented Nov. 3, 1959

2,911,544

SHIFT REGISTER CIRCUIT CONTROLLED BY A PULSE GENERATING CIRCUIT

Bernard Ostendorf, Jr., Stamford, Conn., assignor to Bell Telephone Laboratories, Incorporated, New York, N.Y., a corporation of New York Application October 6, 1955, Serial No. 538,903

8 Claims. (Cl. 307—88.5)

The present invention is a pulse generator circuit for generating differing wave forms of predetermined contour and duration and of predetermined time relation one to another and comprehends also the combination of the generator with communication intelligence storage circuits in high speed communication systems, such as in high speed telegraph or data transmission systems.

An object of the invention is an improvement in pulse generator circuits and in the combination of pulse generator circuits and intelligence storage circuits.

In certain high speed telegraph and telemetering systems, intelligence is conveyed by the sequential transmission, element by element, of multielement two-condition permutation code signal combinations. There is need frequently, however, in such systems for storing the received combinations in their entirety. One situation in which the signal elements of a combination are received in sequence and yet the entire received combination is required to be maintained in storage at the end of reception of the combination is that in which it is desired to subject the received combination to a test to determine if it is plausible before the combination is passed to a subsequent stage of operation. Another situation is that in which each different combination in toto defines the magnitude of a different quantity and the system is arranged in such manner that the quantity must be evaluated before further processing proceeds. In certain multielement permutation code systems, such as in those employing code combinations of binary signal elements, each combination defining a different quantity, a code combination may have as many as thirteen or more elements, each of either of two conditions and the storing of all elements simultaneously requires a storage system having thirteen or more individual storage circuits.

In the present invention, it is proposed to used transistors as the storage elements and, in order to minimize the number required, to provide each individual storage circuit with a single transistor element arranged in such manner that the transistor circuit is bistable. One of the bistable conditions denotes one condition of a single signal element and the other denotes the other condition of the single signal element, such as 0 and 1, respectively, of a signal element in a binary code.

Transistors are well known in the art, being described, for instance, in (1) The Physical Review, July 15, 1948, issue, pages 230 through 233; (2) The Bell System Technical Journal, issue of July 1949, in an article entitled, "Some Circuit Aspects of the Transistor," and in Patents 2,524,035 granted to J. Bardeen and W. Brattain, October 3, 1950, and 2,579,336, granted to A. J. Rack, December 18, 1951.

It is herein proposed also to control the transistor storage array by means of a special pulse circuit. The pulse circuit is designed to produce two differing wave shapes in succession, the first at the beginning and the second very shortly after the beginning of the interval alloted for the reception of each signal element. The storage system has its unit storage circuits connected in tandem. Each of the storage circuits in the tandem array may be considered to have two input sources. One of these input sources is the pulse generating circuit which generates its cycle of two differing pulses during the interval allotted for the reception of each binary signal element of, say, the thirteen element-code combination. These pulses act as controls for the storage units and are applied in parallel to all units. The other input source is the incoming signal combination transmitting the intelligence, such as the assumed binary signal code combination defining a quantity. This is applied directly to the first storage unit and indirectly sequentially in cascade from one unit to the next, one stage at a time, as the signal elements are received.

Confining our attention now to the first signal element of a combination and to the first storage unit, the first of the two pulses of each pulse generator cycle, as distinguished from the intelligence bearing elements, is applied to the first storage unit and directly on the transistor therein. Responsively, the transistor of the first unit is always set initially in its low current carrying or 0 condition. Whether or not the first storage unit is permitted to remain in its 0 condition depends upon whether or not the intelligence bearing signal element actually received, and which is to be stored, is a 0 or a 1. The second, or set 1 pulse as it will hereinafter be called, of the two pulses generated by the pulse generating circuit, is always such a pulse as would set the first storage unit to its high current condition, corresponding to a 1. It is not applied, as is the 0 conditioning pulse, directly to the transistor in the storage unit, but is applied to it through one side of a diode gate, which is cooperatively controlled by this set 1 pulse and the incoming intelligence bearing signal element, which element is applied to the storage unit through the opposite side of the gate. If the incoming intelligence bearing signal element corresponds to the 0 condition, its effect, when applied to one side of the diode gate, is to inhibit the gate and to prevent the set 1 pulse from passing to storage. Under this condition, the 0 condition already in storage will remain unchanged to denote that the intelligence bearing element is 0. If the incoming intelligence bearing signal element is of the condition corresponding to a 1 instead of a 0, its condition when applied to one side of the diode gate in the first storage unit unlocks the gate and permits the set 1 pulse from the pulse circuit to pass. Responsively, the storage unit is actuated to its high current or 1 condition to characterize the first incoming signal element as a 1.

As each signal element of, say, the thirteen-element combination is received in sequence, it is applied, in turn, to the first of the storage units in the tandem array. As the second element is received, the first stored element is transferred to the second storage unit and the incoming signal element is stored in the first. As the third signal element is received, the first two elements stored are passed along to the next succeeding stages of the tandem array and the condition of the third element is stored in the first storage unit. When the last signal element of a combination has been received, all storage units in the array will be filled and the sequential conditions of the storage units in the array will conform to the sequential conditions of the signal elements of the received combination.

Let it now be assumed that the first intelligence bearing signal element of a combination is a 1 and that the 1 condition is stored in the first storage unit of the tandem storage array. At the beginning of the second cycle of the pulse generator, a set 0 pulse is applied in parallel directly to the inputs of all transistor elements in the array and, responsively, all transistors are set to their low current or 0 condition. It is, however, necessary to transfer the 1 condition stored in the first storage unit to the second storage unit. After the termination of the 0 setting pulse, the set 1 pulse from the pulse generator circuit is applied to all storage units in parallel and more specifically to one side of the diode gate in each storage unit. During this interval, if a 1 is to be stored in the second storage unit, it is necessary that the 1 condition be impressed from the first storage unit on the gate of the second storage unit. In order to do this, it is necessary to arrange storage unit 1 so that the 1 condition, assumed to be stored in it, is not wiped out in response to the application of the set 0 pulse. This is performed by incorporating a delay circuit in the interconnection between sequential storage units.

In addition to storing bits of information corresponding to the condition of a particular signal element, therefore, it should be apparent that each storage unit in the cascade array serves also as a protracted storer of the last preceding intelligence bearing signal element it has received for passage on to the next succeeding stage, after the next succeeding stage has been prepared for it by being set to the 0 condition. The condition corresponding to the last preceding intelligence bearing signal element stored in each stage will be maintained in the interconnecting circuit between successive stages, notwithstanding the input of each stage has been set to the 0 condition. Then, after the termination of the set 0 pulse, and during the set 1 pulse, if there is a 1 condition to be passed to the next succeeding stage, it is permitted to pass by the cooperative enablement of the gate of the succeeding stage, by the condition of the set 1 pulse from the pulse generator and the 1 condition of the intelligence bearing signal stored in the immediately preceding stage. If the intelligence bearing signal element in the immediately preceding stage is a 0, during the interval while the set 1 pulse is attempting to enable the next succeeding stage, nothing will be passed and the 0 condition will be maintained therein. It requires both a 1 condition of the intelligence bearing signal element and of the set 1 pulse from the pulse generator to change the 0 condition of any stage to a 1 condition.

From the foregoing, it should be apparent that, with respect to that stage of a tandem array at which the first intelligence bearing 1 signal element condition in a combination has not yet arrived, and with respect to all later stages, they will all be simultaneously set at 0 by the set 0 pulse from the pulse generator circuit at the beginning of the interval of each signal element and they will all be maintained at 0 as a result of the non-enablement of their gates during the following set 1 interval of each signal cycle, due to the non-arrival of an intelligence bearing 1 signal element condition from the last preceding storage units until an intelligence bearing 1 signal element condition in fact arrives at their respective gates. It is emphasized that although the set 0 and set 1 pulses from the pulse generator circuit are applied to all storage stages in parallel, the intelligence bearing signal elements are passed along the tandem chain in cascade, or from one stage to the next in series.

In attempting to control a relatively large number of transistor storage units, such as 10 to 20 or more, in parallel, by a single pulse generator circuit, difficulty was encountered due to interaction between the transistors. The present invention overcomes this difficulty by providing a very low impedance input circuit for the set 0 circuit connecting the pulse generator circuit to all of the storage units in parallel. This is one of the features of the invention and will be described in detail hereinafter.

These and other features of the invention may be understood from the following detailed description when read with reference to the associated drawings which, taken together, disclose a preferred embodiment in which the invention is presently incorporated. It is to be understood, however, that the invention is not limited to incorporation in the present embodiment but may be incorporated in others which may be suggested to those skilled in the art from a consideration of the present disclosure.

Figures 1, 2:
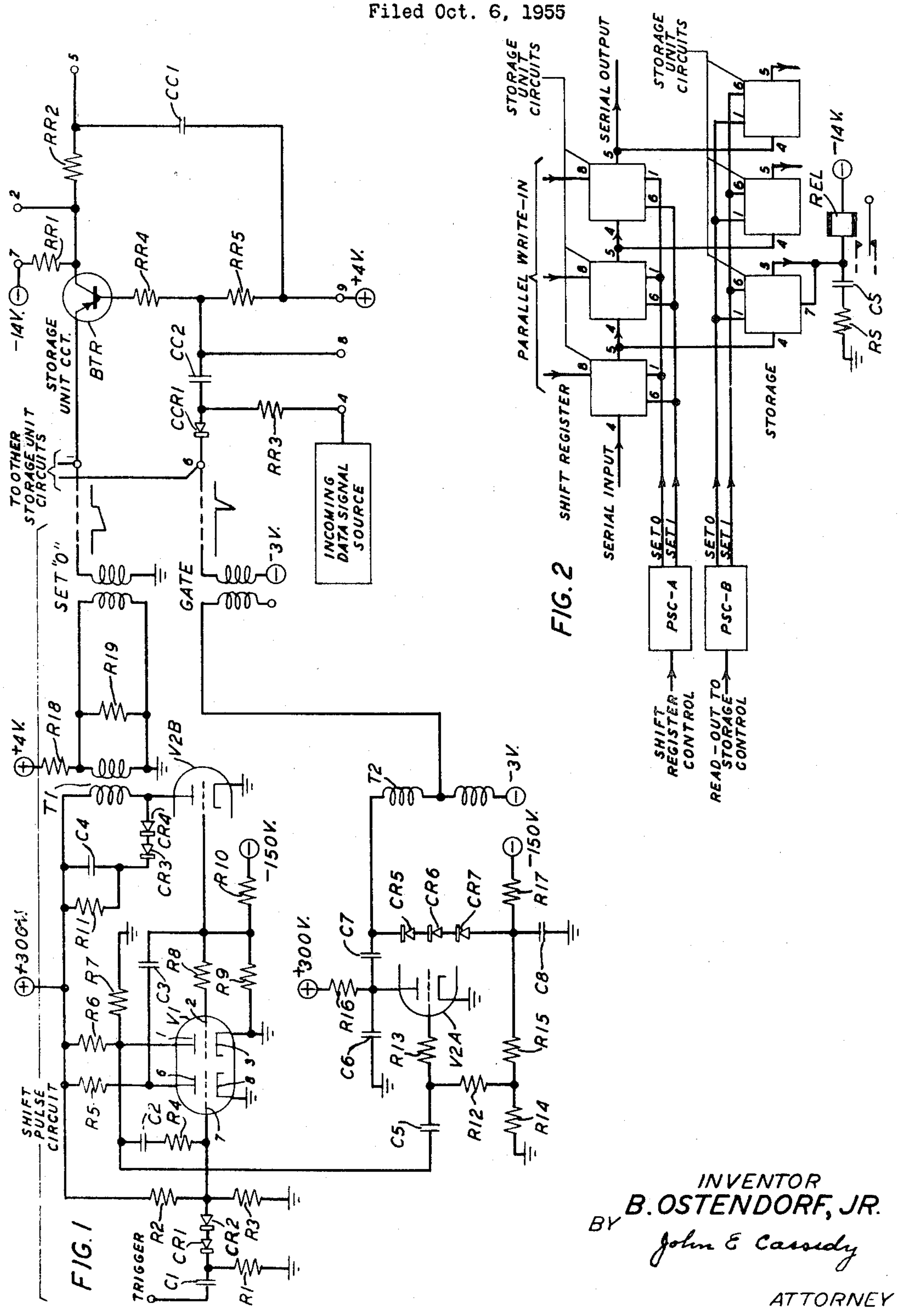
Fig. 1 shows the basic circuit of the invention.
Fig. 2 shows a system in which the circuit of Fig. 1 is incorporated.

Refer now to Fig. 1 in which the shift pulse circuit is shown at the left connected through terminals 1 and 6 to a single storage unit circuit at the right. When arranged for serial read-in of the incoming intelligence, there will be as many storage unit circuits connected in tandem as there are signal elements in the combination. The incoming intelligence bearing signal elements are applied successively to terminal 4. The pulse generator circuit generates a set 0 pulse and a set 1 pulse for each incoming data signal element and applies them, through transformer Set-0 and transformer Gate, respectively, on the storage unit circuit in Fig. 1 and in parallel on all the other storage unit circuits in the array. The output of the storage unit circuit is through terminal 5 which connects to terminal 4 of the next succeeding storage unit circuit in tandem. The upper portion of Fig. 2 shows the foregoing diagrammatically.

In the following, the values of the constants cited are intended as examples and are not to be considered as limitations. The symbols ⊕ and ⊖ appearing in the circuits represent grounded positive and grounded negative battery, respectively.

The shift pulse circuit employs four triodes which may be arranged as two twin triodes. One of these triodes, V1, is used in a monostable circuit to generate a 20-microsecond pulse. Triodes V2B and V2A are suitably coupled to the monostable circuit to serve as amplifiers to produce the set 0 and set 1 pulse.

When the shift pulse circuit is idle, the left-hand triode of double triode V1 is maintained in the conducting condition by a potential divider circuit which may be traced from a source of positive potential, which may be plus 300 volts, for instance, through resistor R2 and resistor R3 to ground. Grid 7 connects to the junction between resistors R2 and R3 and cathode 8 is grounded. The same positive potential source is connected through resistor R5 to anode 6 and through resistor R6 to anode 1; cathode 3 is also grounded. When a negative trigger pulse is applied through capacitor C1, diodes CR1 and CR2, which are connected to the junction between resistor R2 and resistor R3 and the grid 7, become conducting and grid 7 is driven negative. The resulting positive transient at anode 6 is coupled through capacitor C3 and resistor R8 to grid 2. This in turn causes a negative transient at anode 1 which is coupled back to grid 7 through capacitor C2 and resistor R4. The initial trigger pulse is thus reinforced by the gain of the loop just traced and double triode V1 rapidly reaches a state in which its left-hand triode is cut off and its right-hand triode is conducting. After approximately 20-microseconds, the negative transient coupled through capacitor C2 and resistor R4 to grid 7 dies away sufficiently so that the positive potential supplied from the voltage divider comprising resistor R2 and resistor R3 causes the left-hand triode of V1 to start conducting again. The gain around the loop again builds up and the double triode V1 rapidly resumes the idle condition.

During the 20 microsecond period described in the foregoing, grid 2 of the right-hand triode of tube V1 receives a positive swing from anode 6. This positive 20-microsecond pulse is also impressed on the grid of the set 0 pulse amplifier V2B. This causes amplifier V2B to conduct and a high voltage is applied to the primary of transformer T1 for the 20-microsecond interval. A low voltage, low impedance set 0 pulse is obtained from the secondary of transformer T1.

In the foregoing, it was mentioned that one of the features of the invention is an arrangement which permits a large number, 20, for instance, of storage unit circuits to be connected in parallel to one shift pulse circuit. The shape of the set 0 pulse is as shown to the right of transformer Set-0. It is a negative pulse, with a 0-volt base, having a maximum negative value of about six volts and lasting for approximately 20 microseconds. The shape of the set 1 pulse is as shown to the right of transformer Gate. It is a sharp negative pulse from a base of minus 3 volts having a maximum negative potential of minus 12 volts occurring immediately after the termination of the set 0 pulse and lasting for approximately 2 microseconds. The set 0 pulse, when applied to the emitter of the bistable transistor BTR, actuates it to the low current carrying or 0 condition. The set 1 pulse, when permitted to pass to the base of transistor BTR, sets the transistor immediately in the high current carrying condition. In this condition if a large number of circuits are simultaneously set to 1 the current passes through all of the emitters connected in parallel and through the right-hand or secondary winding of the Set-0 transformer to ground. At this time, it is necessary that the impedance of the transformer circuit be very low. This is accomplished by a shunt path across the primary winding of transformer T1. The shunt path consists of capacitor C4 and diodes CR3 and CR4. During the 20-microsecond conduction period of triode V2B, the current in its anode circuit continues to rise. At the end of the period when triode V2B is suddenly cut off, the current in the primary of transformer T1 starts circulating through the shunt path. Most of this current initially flows through capacitor C4. From the secondary winding, this low impedance shunt path appears as but a fraction of an ohm. After a few microseconds, capacitor C4 charges sufficiently so that resistor R11 acts as a damping resistance. The constants of the circuit are selected so that the transient dies away fast enough to permit the pulse circuit to be triggered once in every 150 microseconds which is the rate at which the incoming signal elements are received. There is not any appreciable overshoot at the end of the set 0 pulse. The sudden rise of emitter current for the 1 storage condition of all of the storage unit circuits flowing through the secondary of transformer T1 tends to build up a negative voltage across this winding. This is in the direction to oppose or cancel the transient current flow in the primary circuit. The primary inductance of transformer T1 is such that the primary current reaches a magnitude large enough, during the interval while the 20-microsecond set 0 pulse prevails, to prevent any reversal of current through the shunting diodes when as many as 20 storage unit circuits are set to the 1 condition. To aid in preventing the saturation of the core of transformer T1, a positive current is passed through its secondary winding from a potential source which may be, for instance, plus 4 volts through resistor R18. This current is of such value as to balance the average value of the emitter currents.

The anode of the right-hand triode of tube V1 swings negative during the 20-microsecond period. This negative swing is applied through capacitor C5 and resistor R13 to the grid of triode V2A. Triode V2A is normally in the inactivated condition as a result of a negative voltage applied to its grid, its cathode being grounded. The circuit may be traced from a souce of negative potential, which may be minus 150 volts, through resistors R17, R15 and R14 to ground. From the junction of resistors R14 and R15, a branch extends through resistor R12 and resistor R13 to the grid of triode V2A. A source of positive potential, which may be, for instance, positive 300 volts, is applied through resistor R16 to the anode of triode V2A. The time constant of the coupling circuit is about 5 microseconds which is short compared to the 20-microsecond period of tube V1. The grid of triode V2A is thus driven still more negative at the leading edge of the negative 20-microsecond pulse, but as the 20-microsecond pulse moves positive, toward 0, at its termination, the grid to triode V2A is driven positive for about 2 microseconds. The resulting negative pulse at the anode of triode V2A is coupled through capacitor C7 and autotransformer T2 to furnish the set 1 pulses through transformer Gate.

The type of diode gate used in the storage unit circuits requires a well regulated pulse amplitude. This is provided by a shunt voltage limiter consisting of diodes CR5, CR6 and CR7 connected from the high potential end of the winding of autotransformer T2 to capacitor C8, which is held charged to about minus 90 volts by the potential divider circuit. This prevents the voltage at the top terminal of autotransformer T2 from becoming appreciably more negative than minus 90 volts. The output capability of triode V2A is such that some limiting takes place under the maximum set 1 pulse load condition. This arrangement maintains the amplitude of the set 1 pulse at about 9 volts below the minus 3-volt base. The incoming data signal element may be, for instance, minus 13 volts for a 0 condition and minus 1 volt for a 1 condition. The pulses are applied to terminal 4 of the storage unit circuit and resistor RR3 to the right-hand terminal of the diode CCR1 in the gate circuit. The minus 13-volt pulse prevents the set 1 from passing so bistable transistor BTR remains in the low current or 0 condition. The minus 1-volt pulse permits the set 1 pulse to pass and it is applied to the base through capacitor C2 and resistor RR4. This sets the transistor in the high current or 1 condition.

A source of negative potential which may be, for instance, minus 14 volts is connected through resistor RR1 to the collector of transistor BTR. For the low current or 0 condition, the potential applied through resistor RR2 to output terminal 5 may be, for instance, minus 13 volts and for the high current or 1 condition minus 1 volt. These are the same values as applied to the input terminal 4 and they may be applied to the input terminal 4 of the storage unit circuit of a succeeding stage, and from one stage to another in cascade. The set 0 pulses applied to the emitters of all of the storage units in parallel set them all to 0 preparatory to the reception of the data signal pulse. If there is a 1 stored in a storage unit, it is maintained until the set 1 pulse arrives by operation of the delay circuit comprising resistor RR2 and capacitor CC1. Capacitor CC2 in the next succeeding unit also cooperates in this as it requires time for capacitor CC2 to reach the potential of the incoming data pulse applied to its terminal 4.

The manner in which the storage unit circuits function in response to the application of signal elements successively to a group of them arranged in tandem has been explained. Such an array operating in such manner is sometimes called a shift register. A group of storage units can also be arranged in such manner that instead of applying the signal elements of a multielement permutation combination to them consecutively, known as serial write-in, all of the elements of a combination may be applied to them simultaneously. That is to say, each element of the combination is applied to an individual storage unit circuit simultaneously. This is sometimes termed parallel write-in. In such operation, it is also necessary to first set the storage unit circuit to the 0 condition so that the whole array is, as it were, empty. Then, the voltage condition for the 0 or 1 condition is applied directly to the transistor base through terminal 8 and resistor RR4.

In the upper portion of Fig. 2 a group of storage unit circuits are shown arranged for either serial or parallel write-in. Intelligence stored in one group of storage unit circuits may be transferred simultaneously to a second group. This is also indicated in Fig. 2. The intelligence in the upper group of storage unit circuits may be transferred to the lower group. Each group is provided with an individual shift pulse circuit. In such an arrangement, the upper group may operate as a shift register, then when an entire combination is stored in it, the lower group may be all set to 0 by a properly timed set 0 pulse and then enabled, by a following set 1 pulse, to receive whatever may be stored in a corresponding individual storage unit circuit in the upper row.

The lower group of storage units in Fig. 2 may control individual relays by connecting the negative voltage source which is ordinarily connected directly to terminal 7 of the storage unit through the winding of a relay, such as relay REL to terminals 7 and 5 in parallel. Resistor RS and capacitor CS shunt the winding of relay REL to cancel its inductive reactance so as not to interfere with the triggering of the transistor in the storage unit circuit.

What is claimed is:

1. In a communication system, one pulse circuit, a plurality of transistors, a connection from said circuit to said transistors arranged in parallel, said connection having means including a transformer intermediate said pulse circuit and said transistors for impressing a first pulse from said circuit on said plurality of transistors simultaneously, a signal source, a second connection from said signal source to said transistors for impressing a second pulse on said transistors immediately after the cessation of said first pulse, and shunt circuit means, connected directly across a winding on said transformer responsive to the impressing of said first pulse on said transistors for transiently automatically lowering the impedance of said first connection to prevent interaction between said transistors in response to said second pulse.

2. In a communication system, a pulse circuit, a plurality of transistors, a connection from said pulse circuit to said plurality of transistors arranged in parallel, means in said connection for impressing a pulse on said transistors simultaneously, said means comprising a transformer, and a low impedance shunt circuit connected directly to said transformer, responsive to said pulse, said shunt circuit having means to transiently automatically lower the impedance of said connection in the direction from said transistors to said pulse circuit for an interval immediately following said pulse, means for impressing a signal pulse on said transistors during said interval, and means for directing said signal pulse from said transistors through said connection in said direction to prevent interaction between said transistors.

3. In a communication system, a control circuit, a plurality of transistors, each of said transistors having an emitter and a base, a first connection from said control circuit to said plurality of transistors arranged in parallel, said connection having a link extending from ground to an individual emitter in each of said transistors, a second connection from said control circuit to said bases in parallel, means responsive to the impressing of a pulse on said emitters through said first connection for transiently producing a low impedance in said first connection, and means for triggering said transistors while said low impedance condition prevails.

4. In a communication circuit, a plurality of transistors arranged in parallel, a first control branch connected to said plurality for triggering them simultaneously to their high current conditions, a second control branch connected to said transistors in parallel, means responsive to said triggering for increasing the flow of current from said transistors to said second control branch, and means for transiently producing a low impedance in said second control branch when said current is increased to prevent interaction between said transistors.

5. In a communication system, in combination, a shift pulse circuit, a shift register circuit, a connecting circuit interconnecting said circuits, means for impressing data signal elements of either of two conditions serially on said shift register circuit, means jointly responsive to the impressing of said data signals, and the impressing of pulses from said pulse circuit, through said connecting circuit, on said shift register circuit, for storing multi-element permutation code signal combinations in said shift register circuit, and a low impedance transient control in said connecting circuit to prevent interaction between component units of said shift register circuit when responding to the impressing of said pulses thereon.

6. A pulsing and storage system, having a pulse circuit, a transformer having a primary winding and a secondary winding, said primary winding connected to said pulse circuit, a plurality of transistors, each of said transistors having an input circuit connected in parallel to said secondary winding, means for transmitting a pulse from said pulse circuit through said windings to each said input circuit, a shunt circuit connected across said primary winding, said shunt circuit having means responsive to the termination of said pulse for producing a very low impedance between said input circuit and said transformer for a short interval following the termination of said pulse and means for directing a signal pulse through said transistors and said impedance during said interval.

7. A system as defined in claim 6, said shunt comprising a diode in series with a parallel combination of a capacitor and a resistor.

8. A pulsing and storage system, having a pulse circuit, a transformer having a primary winding and a secondary winding, said primary winding connected to said pulse circuit, a transistor, said transistor having an input circuit connected to said secondary winding, means for transmitting a pulse from said pulse circuit through said windings to said input circuit, a shunt circuit connected across said primary winding, said shunt circuit having means responsive to the termination of said pulse for producing a very low impedance between input circuit and said transformer for a short interval following the termination of said pulse, said transistor having a second input circuit connected to said pulse circuit, means in said pulse circuit for applying another pulse to said other input circuit immediately upon said termination and while said low impedance condition persists, so that said second pulse may be properly stored in said transistor.

References Cited in the file of this patent

UNITED STATES PATENTS

| | | |
|---|---|---|
| 2,273,934 | Campbell | Feb. 24, 1942 |
| 2,627,039 | MacWilliams | Jan. 27, 1953 |
| 2,723,355 | Graham | Nov. 8, 1955 |
| 2,758,206 | Hamilton | Aug. 7, 1956 |

FOREIGN PATENTS

| | | |
|---|---|---|
| 1,096,793 | France | Feb. 2, 1955 |